May 19, 1953     T. A. FEENEY ET AL     2,638,736
DUAL SOURCE FULL POWERED CONTROL SYSTEM
Filed Aug. 3, 1948     4 Sheets-Sheet 1

INVENTORS
THOMAS A. FEENEY
ALVIN R. VOGEL
BY Herbert E. Metcalf
Attorney

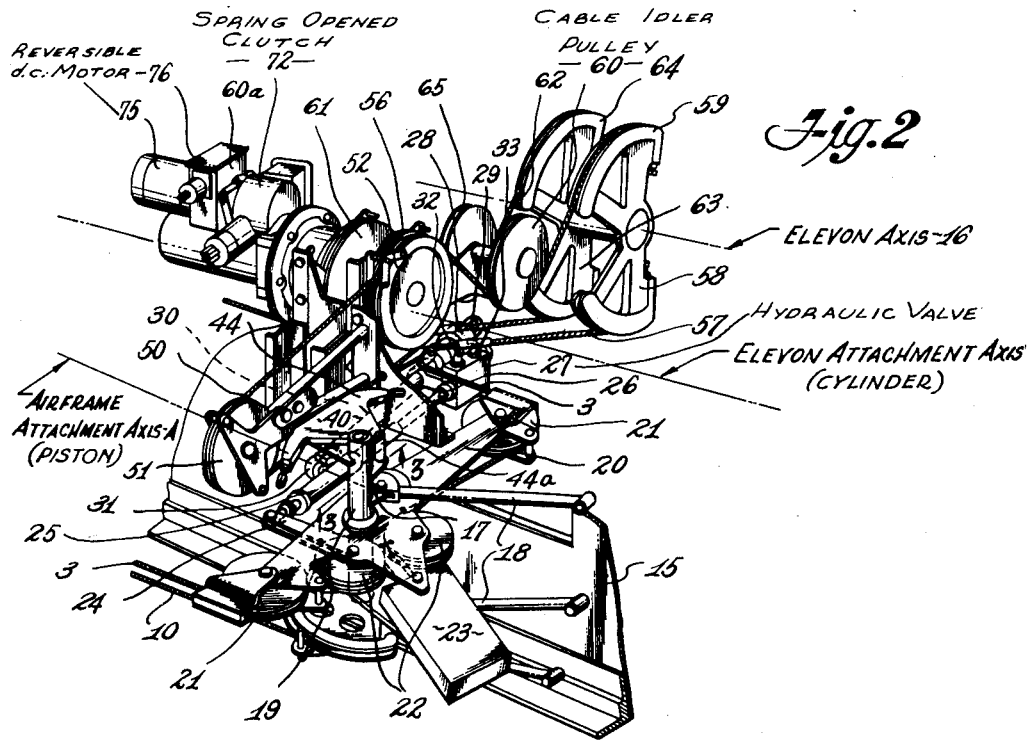

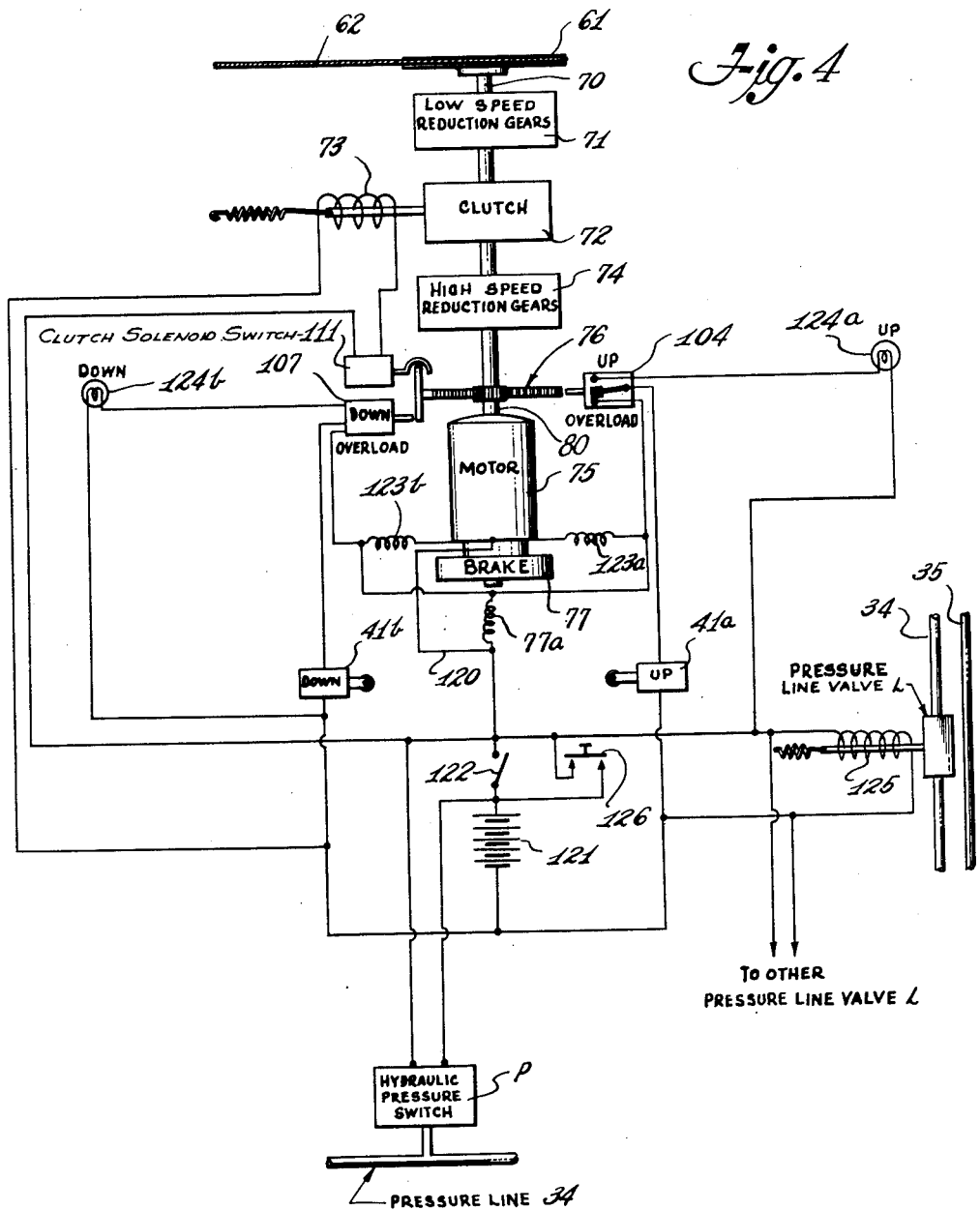

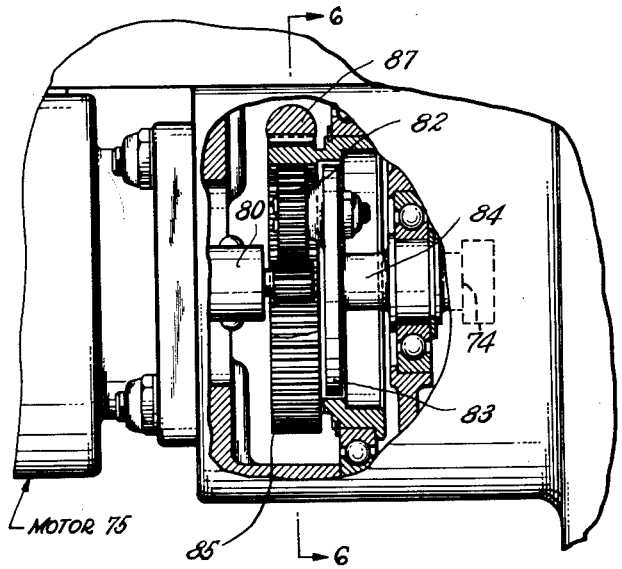
Fig. 5
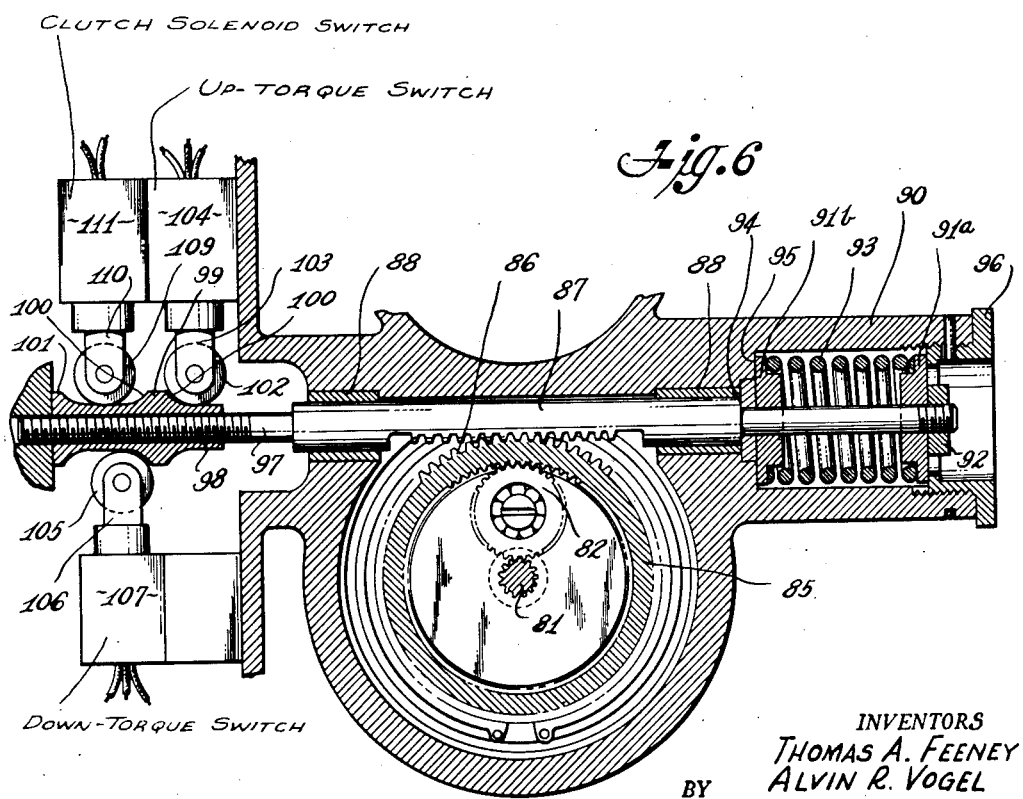
Fig. 6
INVENTORS
THOMAS A. FEENEY
ALVIN R. VOGEL
BY
Attorney Patented May 19, 1953

2,638,736

UNITED STATES PATENT OFFICE 2,638,736

DUAL SOURCE FULL POWERED CONTROL SYSTEM

Thomas A. Feeney and Alvin R. Vogel, Los Angeles, Calif., assignors to Northrop Aircraft, Inc., Hawthorne, Calif., a corporation of California Application August 3, 1948, Serial No. 42,265

28 Claims. (Cl. 60—6)

The present invention relates to a means and method of operating an airplane attitude control surface under full power by conventional control movements by the pilot of the airplane, and, more particularly, to a surface control system in which two fully power operated control systems are connectable to move the same control surface, each actuated from a different type of power source, the systems being capable of alternate use at any time during flight and in any position of the control surface.

In large airplanes, and in smaller airplanes operating at high speeds, the air loads encountered in moving attitude control surfaces on said airplane, such as rudders, elevators, ailerons or elevons may be so high as to preclude direct manual operation of these surfaces by the pilot. In consequence, full power operation of these surfaces in accordance with the movements of the pilot's control element may be highly desirable. In such a full powered control, the force required to be exerted by the pilot is very small as compared to the power required to move the surface, and under such conditions the piloting movements result in signals rather than forces, these signals being used to control the applied power. In addition, in order that pilots already trained in the conventional manual control of airplanes can be efficiently utilized in the piloting of an airplane equipped with fully powered control surfaces, the response of the power unit and the surface controlled thereby to pilot signals should closely simulate the response that would be obtained if direct manual control were to be possible, in both instances using conventional piloting procedure.

Such a control system, where the entire power used to move an attitude control surface is provided by hydraulic fluid pressure flow, has been shown, described, and claimed in the copending application of Feeney, Serial Number 23,567, filed April 27, 1948, and has proven to be highly satisfactory under all flight conditions.

However, in large or high speed airplanes, and particularly in military airplanes, it is highly desirable that two separate and distinct fully powered operating motors be provided to move an attitude control surface in accordance with piloting signals, even to the point of utilizing power sources and mechanisms of an entirely different character, in order to insure maximum safety in flight in case one system should fail for any reason, and both systems should control the airplane with equal facility. It is an object of the present invention to provide a means and method of controlling two separate attitude surface operating motor systems of different types, each energizable from power sources of different character and type by movements of the same pilot's controls, the pilot having a choice of which motor should be utilized.

It is another object of the present invention to provide a means and method of shifting control surface operation from one surface operating motor system to another, without disturbing the flight attitude of the airplane or substantially changing the relationship of the piloting movements with respect to surface response.

In the copending application cited above, a full powered surface operating system was disclosed in a preferred form as utilizing a hydraulic piston and cylinder, defined as a hydraulic motor, moving the surface and having a servo valve spool moved by the pilot, with a follow-up relation of the servo valve to the surface to cause the surface, when moved by the hydraulic motor, to follow the pilot initiated movements without transmitting any surface air loads back to the pilot. This system provided a surface response substantially the same as would have been obtained by direct manual movement of the surface by the pilot, had that been possible.

The present invention preferably utilizes the same or similar hydraulic motor system and control as a primary fully powered surface operating system, with an option of utilizing a secondary electric motor system for movement of the same surface in response to movements of the same pilot's control element, each system being interchangeable for control purposes. As they are interchangeable, it may be desirable to utilize the electric system as a primary control with a hydraulic system as a secondary control, and the invention is not deemed to be limited to either system as first choice for normal operation of the airplane.

As the ability to shift from one type of full powered control system to another for operation of the same surface without substantially interfering with normal flight depends upon a similar response of the two systems to pilot initiated movements of the same control element, it is still another object of the present invention to provide a fully powered electrical control system moving an airplane control surface in accordance with the extent and direction of movement of a pilot's control.

When full power operation of an airplane attitude control surface is provided, the fact that such operation is used at all is indicative of the fact that high air loads are to be encountered in the movement of such surfaces. As the pilot force required to cause the surface to move is small, and is uniform regardless of the air load on the surface, it could easily happen that the pilot might move the surface to a position where the resultant air load might exceed the design load limit for the structure, or its attachment to the airplane. Thus any such full powered system should, for maximum safety, include a means and method of preventing excessive air loads being imposed on the surface being moved.

In the application cited above, one preferred way of so preventing excessive air loads during hydraulic operation was disclosed, whereby the hydraulic pressure and the hydraulic motor power applied by that pressure to the surface was so limited that the surface air load balanced the applied control force at a maximum safe figure. As an electric motor is easiest controlled by on and off switches and as it is not desirable to stall such motors with current flowing therein, it is another object of the present invention to provide a means and method of measuring the air loads on the controlled surface and shutting off an electric surface moving motor when a predetermined air load thereon is reached, irrespective of the condition or position of the pilot's control element, so that the maximum air load which can be applied to the control surface can be made to be substantially the same as a second system, when two distinct surface driving systems are used, for example.

In broad terms, the invention comprises an attitude control surface attached to an airplane and adapted to be moved from a neutral position for the normal flight control of the airplane. Such surfaces may be the rudder, elevators, ailerons, and elevons of the airplane or all of them. Two separate surface moving motors preferably of two distinct types such as a cylinder-piston hydraulic motor, and an electric motor are provided, each able to supply the total power required to move the surface selected to be power operated, and are energized by separate power sources of the proper type for the energization of the respective motors. The pilot's control element is connected to move the motor controls of both motors in unison at all times, with these controls synchronized, and the surface or surfaces moved are connected to feed back surface movement to both the motor controls in synchronism, so that when the respective motor controls are alternately connected to the corresponding motors, the control of the surface by one motor will take over movement of the attitude control surface where the other motor left off. Within the operational limits of the different mechanisms, the response to movements of the pilot's control element is substantially the same and both systems closely similate direct manual and conventional operation of airplane control surfaces, in general. Both systems operate under full power without surface load feed back of any kind to the pilot. It is possible for the pilot to alternate the control systems in flight at will and without substantial change in his flying technique.

A preferred combination of systems is a hydraulic system for use as a primary control and an electrical system for a secondary control although as stated above, if desired the systems can be reversed as to priority of use. The invention includes the added feature of providing torque limitation in both systems to prevent excessive air loads from being applied to the control surface.

Other advantages and objects of the present invention may be more fully understood by reference to the drawings and the following description of one preferred way in which the elevons of a large all-wing airplane can be alternately controlled under full power by a hydraulic power system and an electric powered system.

In the drawings:

Figure 2 is a perspective view of a hydraulic motor and control assembly and an electric motor and control assembly illustrating the present invention as installed to move the elevons in the airplane of Figure 1.

Figure 3 is a plan view from below showing the relationship of the electric motor controls and elevon feed back taken as indicated by line 3—3 in Figure 2.

Figure 4 is a diagrammatic view of the motor and gear assembly together with a schematic electrical motor operating circuit.

Figure 5 is a side view partly in section and partly in elevation of a torque limiting device used in the gear assembly.

Figure 6 is a cross-sectional view partly in elevation of the torque limiting device taken as indicated by line 6—6 in Figure 5.

Figure 1:
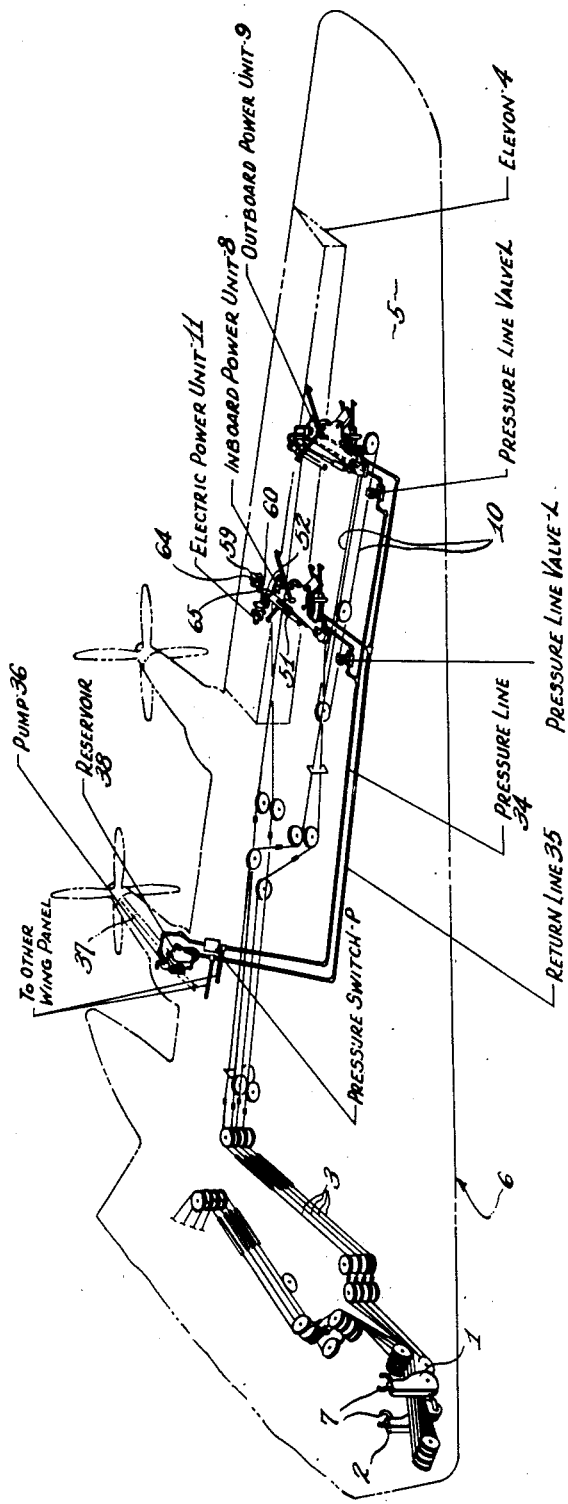
Figure 1 is a diagrammatic view of the central portion and one wing panel of a four motored all-wing airplane showing the location of a preferred form of the present invention.

Referring first to Figure 1, for a general installation diagram of the preferred system, a pilot's control column 1 and a co-pilot's control column 2 are connected to move duplicate elevon control cables 3 leading to elevons 4 positioned on each wing panel 5 of an all-wing airplane 6. The two control columns, when moved foward or aft are arranged to move both elevons downwardly or upwardly in unison for elevation control, and when wheels 7 mounted on the control columns are rotated, the elevons are moved in opposite directions for roll control. Both of these motions can be simultaneously carried out when necessary and the column and wheel are provided with spring centralizing devices (not shown).

In each wing panel 5 one pair of cables leads to an inboard hydraulic power unit 8 and the other pair of cables leads to an outboard hydraulic power unit 9, the units being interconnected by cross cables 10. This cable arrangement insures maximum safety as either pair of cables alone will operate both hydraulic motor units.

One of the hydraulic power units, preferably the inboard unit 8, has associated with it a secondary or standby electric power unit 11 connectable to move the elevon. The structure and relationship of the two motor units is shown in detail in Figure 2 which will next be referred to.

Rotatably mounted on a wing spar 15 ahead of the elevon axis 16 on arms 17 pivotally supported by brackets 18 is a vertical tube 19 to which a cable lever 20 is attached. Cable pulleys 21 on the ends of cable lever 20 receive the cables from a cable pair 3, pass around these pulleys and around idler pulleys 22 also mounted on cable lever 20 to end in a tension regulator 23 mounted on the cable lever. Thus, relative movement of the cables 3 caused by operation of the control column 1 or 2 will rotate tube 19.

This rotation moves a long bell crank arm 24 which is rotatably attached to a spring loaded valve operating rod 25 passing through the wing spar 15 to link with a valve spool 26 entering a hydraulic valve 27 attached to a hydraulic cylinder 28. Cylinder 28 is attached at one end to an elevon operating arm (not shown), by an arm fitting 29 at the closed end of the cylinder, the other end thereof having a piston rod 30 entering the cylinder and connected to a piston (not shown) operating in the cylinder, as is well known in the art. Piston rod 30 is attached at its end to the airframe by rod eye 31 at airframe attachment axis A. Valve 27 is provided with a hydraulic fluid inlet 32 and a hydraulic fluid return 33, respectively connected to pressure line 34 and return line 35 as shown diagrammatically in Figure 1.

Pressure line 34 is supplied with fluid from pump 36 rotated by a propeller shaft 37, and return line 35 leads to a hydraulic reservoir 38 from which the fluid is supplied to the pump. Pump 36 is provided with pressure regulator means (not shown) to maintain a constant predetermined pressure in line 34. The pressure line 34 is supplied with a pressure switch P normally open, that can be set to close at a predetermined minimum pressure in pressure line 34. In addition, the pressure line 34 is provided with a solenoid operated pressure line valve L adjacent each hydraulic power unit 8 and 9, each valve being normally de-energized and spring urged to permit fluid under pressure to reach the hydraulic motors, but which when energized will close the high pressure line to both motors, so that the hydraulic motor can be moved without developing a hydraulic lock, for purposes to be taken up later.

In operation of the hydraulic motor, movements of the control cables 3 rotate bellcrank arm 24 to move the valve spool 26 in or out of the valve 27. The valve spool is normally in a neutral position where, in a preferred form, there is a small neutral leakage of hydraulic fluid to both sides of the piston and to the return so that the surface is stabilized against movement under varying air loads when the valve is neutralized. Pilot initiated movements of the valve spool will admit fluid at a pressure above the preload to one side or the other of the piston, and will open the other side of the piston to the return line 35 thereby causing full powered movement of the surface.

As the cylinder 28 and its attached valve 27, moves as the surface moves, the valve follows the spool until the neutral position again is reached, whereupon surface movement stops with the surface at the position determined by the pilot's positioning of the spool. Thus, the surface follows all pilot initiated movements of the spool. As the spool friction is small, less even than the friction load in the cable system and column, and far less than the spring centering forces acting on the column, no surface forces are fed back to the pilot, and the control technique utilized by the pilot to control the airplane is substantially the same as that employed in general by an airplane pilot, with of course the exception that the pilot feels no air loads as he moves the control surface.

An electric power unit is provided adjacent the inboard hydraulic power unit, as shown in Figures 2 and 3.

Mounted on the top of tube 19 and rotating coaxially with it, is a direction switch assembly 40, as shown in Figure 3, having two spaced direction sensing electric switches 41a and 41b of the micro switch type, their actuators 42 terminating in actuator rollers 43 extending outwardly the same radial distance. A cable sector 44 is positioned to rotate on a pin 44a extended from tube 19 independently of switch assembly 40, coaxially with the axis of rotation of tube 19 which is the axis of rotation of direction switch assembly 40. Switch assembly 40 and cable sector 44 are positioned one above the other.

Beneath and on cable sector 44 near the periphery thereof is positioned a circular cam 45 having an arc surface 46 centered on the axis of rotation of sector 44 and having a radius slightly shorter than the radial extent of actuator rollers 43, the latter being positioned so that the rollers 43 will contact arc surface 46 and depress the attached actuator when relative rotation occurs between the switch assembly 40 and the cable sector 44. Adjacent the ends of cam 45 the arc surface 46 terminates in indents 47 continuing as short arc surfaces 48. The actuator rollers 43 are spaced so that with arc surface 46 centered between the rollers, these rollers are each in an indent 47 with their actuators fully extended. Each actuator 42 is spring pressed outwardly and when the rollers 43 are in the indents both of the switches are open, but when one roller is on arc surface 46 the corresponding switch is closed.

With the cam 45 stationary, pilot initiated movements of direction switch assembly 40 in one direction, will cause one of the rollers to ride on arc surface 46 thereby closing the related sensing switch, the other switch remaining open. Movement of the direction switch assembly in the other direction will cause the other sensing switch to ride on arc surface 46 and close, the opposite sensing switch remaining open. Thus, the sensing switch closed by an elevon up-movement of the control column 1 or 2 may be termed the up-switch 41a and the other sensing switch the down-switch 41b.

As shown in Figure 2, rotation of cable sector 44 by the elevon 4 is provided by a feed back cable 50 passing around feed back pulleys 51 and 52 one on each side of cable sector 44, with the cable ends 53 crossing sector 44 tangentially to terminate in sector nuts 54 attached to the ends of the sector arc.

The aft feed back pulley 52 is driven by a feed back drive pulley 56 attached to pulley 52, a feed back drive cable 57, one end of which is attached to a lower feed back drive quadrant 58 directly, the other end being attached to an upper feed back drive quadrant 59 after passing around a feed back drive cable idler pulley 60. Feed back drive quadrants 58 and 59 are attached to elevon axis 16 and rotate as the elevon rotates. Thus, cable sector 44 and its attached cam 45 is rotated by the elevon, and the cooperating switch assembly 40 is rotated by the airplane pilot through the control column.

It will be noted that the long bell crank 24 which operates valve spool 26 through valve operating rod 25 and the switch assembly 40 are both attached to torque rod 19 and, in consequence, rotate together in accordance with movements of the pilot's control column 1. The switch assembly 40 is attached to the torque tube 19 so that cam 45 maintains both of the switches 41a and 41b open when the pilot's control column is centralized. Similarly, the relation of valve spool 26 to the long bell crank 24 is adjusted to place the valve spool 26 in neutral position in hydraulic valve 27 when the pilot's control column is centralized. Thus the controls for the hydraulic motor and for the electrical motor have the same neutral point from the aspect of the pilot's control column connection, and when one set of controls is in neutral, the other set is in neutral in the centralized position of the control column 1.

From the surface feedback aspect, a similar situation obtains. When the valve spool 26 is displaced by the pilot, for example, when using the hydraulic system, hydraulic pressure is applied to the system to move the surface and, as the hydraulic cylinder 28 moves with the elevon 4, the attached valve 27 moves to follow the displacement of the spool 26 until the neutral position of the spool 26 in the valve 27 is again reached.

As the valve spool 26 is displaced by the pilot, the position of the two rollers 43 with respect to cam 45 is also changed, and one of the switches 41a or 41b is closed regardless of whether or not it is connected to the electrical system. Cam 45, however, is connected to move with the surface through cable sector 44, feedback cable 50, feedback pulley 52, feedback drive cable 57 and feedback drive quadrants 58 and 59 attached to elevon 4, so that when the valve 27 of the hydraulic system is returning to the neutral position of the spool 26, the cam 45 of the electrical system is returning to the neutral switch position where both switches are open. The relationships of both pilot's control and surface feedback motions are made to be such that the neutral or "both open" position of the switches 41a and 41b, with respect to cam 45, always coincides with the neutral position of spool 26 in valve 27 at all displacement positions of the spool and the switches after the surface has moved.

Thus in the operation of the motor controls, the pilot movements move both the valve spool 26 and the direction switch assembly 40 in unison at all times and in synchronism as to direction and extent. The feed back of the cylinder valve over the valve spool, and of the cam 45 over on the direction switch assembly takes place in unison at all times and in synchronism as to direction and extent, so that when either one of the motor systems is operating under power, the motor control-feed back relationship of the system not being used, is the same as that of the motor being used, at all times and at all positions of the elevon.

The elevon is electrically driven by an electric motor and gear assembly 60a shown grossly in Figure 2, connected to rotate a power drive pulley 61 in co-axial relationship with aft feed back pulley 52. Power drive cable 62 passes around power drive pulley 61 and leads directly to lower power drive quadrant 63 and to upper power drive quadrant 64 after passing around power drive idler pulley 65. Power drive quadrants 63 and 64 are attached to rotate around the elevon axis 16 alongside of feed back quadrants 58 and 59 respectively. The power drive system is positionally and dimensionally the same as the feed back system except that they are side by side, and that the feed back system is extended to rotate cable sector 44.

The motor and gear assembly is shown diagrammatically in Figure 4, gear reduction details being omitted in favor of clarity of illustration of the operational principles thereof. The main drive pulley 61 is attached to a motor and gear assembly output shaft 70 which leads through low speed reduction gears 71 to a clutch 72 spring opened, and electrically closed by clutch solenoid 73 and then to high speed reduction gears 74 to a reversible D. C. motor 75 through a torque limiting device 76. Motor 75 is also provided with a conventional brake 77 which is released when the motor is energized and spring applied when the motor is de-energized, irrespective of direction of motor rotation. The electrical connections of Figure 4 will be described later.

As it is highly desirable to limit the hinge moments on elevon 4 to a safe value, the details of the torque limiting device 76 as built into the motor and gear assembly 60 are shown in Figures 5 and 6.

The torque resulting from the air load on the elevon is measured in this case at the motor end of the gear assembly. Motor shaft 80 drives a small pinion 81 meshed with a planet gear 82 mounted on a disc 83 whose shaft 84 leads to the remainder of the high speed reduction gears 74, as shown in Figure 5. Meshed internally with planet gear 82 is a ring gear 85 having outside teeth 86 thereon meshing with a rack 87 extending laterally, and laterally moveable in both directions in bearings 88. On one end of rack 87 is positioned a centering spring assembly 90.

Centering of the rack by this assembly is accomplished by extending rack 87 at reduced diameter through a pair of spaced end plates 91a and 91b to terminate in a nut 92. End plates are forced apart by a preloaded spring 93, the end plates being held from moving outwardly by a rack shoulder 94 on the rack 87, in one instance, and by the nut 92 in the other instance. During movement of outer end plate 91a inwardly the opposite end plate 91b is held by casing shoulder 95 and during movement of the inner end plate 91b outwardly the outer end plate 91a is held in place by retaining nut 96. Thus, lateral movement of the rack 87 in either direction will compress spring 93 and the rack is centralized when all external forces on the rack 87 are removed.

The other end of the rack 87 is provided with an extension 97 having a cam 98 thereon provided with a central cam ridge 99 having curved sides 100, to form a half trough on the inner side of the ridge 99 and, with a terminal ridge 101 to form a full trough on the other side of the ridge 99.

In the half trough, close to ridge 99 is positioned an up-roller 102 attached to an up-actuator 103 entering an up-torque switch 104. Up-torque switch 104 is a single pole, double throw switch performing two functions. The pole and normally closed contact form an up-overload switch, while the pole and normally open contact form an up-overload warning light switch, as shown in Figure 4. Inward motion of the up-actuator 103 simultaneously opens the up-overload switch, wired in the motor control circuit, and closes the up-overload warning light switch.

In the full trough, also close to ridge 99 is positioned a down-roller 105 attached to a down-actuator 106 entering a down-torque switch 107 and operating a normally closed down-overload switch and a normally open down-overload warning light switch.

In substantially the center of the full trough is positioned a clutch solenoid roller 109 mounted on a clutch solenoid switch actuator 110 operating a normally closed clutch solenoid switch 111.

When the motor is rotating in either direction, with clutch 72 engaged, the motor shaft pinion 81 rotates planet gear 82 around the inside teeth of ring gear 85 and thus rotates disc 83 to drive the gear trains, and rotate the elevon on its axis. However, the rotation of planet gear 82 also causes a torque reaction in the ring gear 85 proportional to the magnitude of the load on the elevon, which will of course increase as the air load on the elevon increases. As ring gear 85 meshes with rack 87, and as rack 87 can move laterally against the force of spring 93, after the spring preload is exceeded, to permit ring gear 85 to rotate slightly, the lateral movement of rack 87 can be calibrated in terms, for example, of the hinge moment on the elevon, and the overload switches 104 and 107 and clutch solenoid switch 111 can be set to be actuated at a predetermined elevon hinge moment limit. It should also be noted that the torque responding action of rack 87 will also take place when the motor 75 is stopped and locked by action of motor brake 77, i. e., its manner of action is the same whether the motor is running or not, although the switches will be actuated at different hinge moments due to the reversal of the friction effect existing in the gearing of the system between the elevon and rack.

When the hydraulic system is operating, the clutch 72 is open and the elevon moves freely by reversing the low speed gear train 71 only.

Assuming the hydraulic system is in use, the shift to the electric system, and its manner of operation will next be described.

Referring again to Figure 4 for a schematic wiring diagram of the various switches and mechanisms of the electric system, motor lead 120 is connected to a D. C. source 121, along with motor brake coil 77a, through a pilot's switch 122. The other pole of the source is connected to a divided line, each lead passing through up or down direction sensing switch 41a or 41b, both normally open and in series through an overload switch 104 or 107, normally closed, to a direction winding 123a or 123b of the motor 75. The motor brake coil 77a parallels both of the motor windings 123a and 123b. The overload warning light switches, normally open, are connected to light an up-overload warning lamp 124a or a down-overload warning lamp 124b, when closed in accordance with direction of rack motion on the torque limiting device.

Clutch solenoid 73 operating the clutch 72 is connected through clutch solenoid switch 111, normally closed, to battery 121 through pilot's switch 122.

A line solenoid 125 operating pressure line valves L is also connected to battery 121 through pilot's switch 122.

As it may be desirable that the electric system be placed in operation automatically upon a substantial reduction or failure of hydraulic pressure while the hydraulic system is being used, the pilot switch 122 may be paralleled by the hydraulic pressure switch P normally open, which will close upon reduction of the hydraulic pressure to shift elevon control to the electric system. It is also convenient to bridge the pilot's switch 122 by a pilot's push button 126 positioned on his roll control wheel 7, with the pilot's switch 122 being mounted on the control column. It is, of course, to be understood that switches 122 and 126 are duplicated on the co-pilot's control column.

To place the electric control system in operation at any time, either the pilot closes switch 122, or push button 126, or, due to reduction of hydraulic pressure in the hydraulic system, the electric system is energized by the closing of the pressure switch P in the hydraulic fluid pressure line 34.

Closure of switches 122, 126, or P places the electrical system in operation as follows: Considering that these switches operate when the pilot's control column is in neutral position. In this condition, the energization of hydraulic solenoids 125 attached to pressure line valves L cuts off the hydraulic pressure from the cylinders. Both sides of the piston in hydraulic cylinders of the inboard and outboard hydraulic power units 8 and 9 then alternately open to the return line 35 through the servo valve 27 as it moves from one side of neutral to the other. This valve, of course, continues under all normal circumstances to move with the elevon, and the spool moves with the pilot's control. This action permits the cylinder 28 to move freely over the piston therein without developing a hydraulic lock.

At the same time, clutch solenoid 73 is energized to connect motor 75 to main drive pulley 61. The motor does not run, however, as both direction sensing switches 41a and 41b will be open, as their rollers will both be in indents 47 on the arc cam 45.

When the pilot's control is moved, the direction switch assembly 40 will be moved with respect to sector 44 and one or the other of the direction sensing switches 41a and 41b will be closed. This action releases the motor brake 77 and the motor rotates to move the surface in the proper direction. As the surface moves, sector 44 moves to follow the switch assembly movement initiated by the pilot. When pilot's control movement ceases, this same direction sensing switch 41a or 41b opens to stop the motor and the surface, leaving the surface in the new position as determined by the position of the direction switch assembly. Since the motor brake 77 is applied when the motor 75 ceases to be energized, the surface is brake-locked in the new position so that normal air loads cannot move it.

As the pilot's control transmits only a signal to the electrical system, no feel of the air load is transmitted to him. In consequence, the torque limiting device previously described is operated when an air load on the elevon approaches the predetermined limit as follows:

It will be noted from Figure 6 that one or the other of the torque switches 104 or 107 will be actuated when the rack 87 moves laterally in either direction due to increasing torque as the air load increases. This action lights one of the overload warning lights 124a tor 124b located in view of the pilot, and also shuts off the motor 75 and applies the motor brake 77. If the air load on the surface continues to increase, the rack will move further in the same direction to open the clutch solenoid switch 111 releasing the clutch 72 and permitting the surface to free wheel momentarily back toward neutral under the air load. This release of the load on the rack 87 causes the solenoid 73 to reclutch the motor to the surface. If the air load continues to decrease, the rack will move toward neutral sufficiently to again close the overload switch, bringing the system back under control of the pilot in that direction.

If the air load does not continue to decrease after reclutching occurs, the motor circuit is still held open by the rack, and the overload switch, so that the pilot cannot move the surface in the direction to increase the air load. However, as the overload switch in the other direction of surface movement is closed, the pilot can, by reversing his control movement, always move the surface in a direction to reduce the air load and thus permit the rack to move sufficiently toward neutral to close the overload switch on the overload side, and extinguish the warning lamp. This latter procedure would be, of course, the normal reaction of the pilot, and the free wheeling action is an emergency feature that comes into play only when the pilot does not or cannot reduce the surface overload by moving the surface away from its overloaded position.

By proper adjustment of the centering forces acting on the rack 87 it is possible to limit the maximum load that can be applied to the elevon by the electric system to be substantially the same as the maximum load that can be applied to the elevon by the hydraulic system, so that the sursafe cannot be overloaded with either system in operation.

An important feature of the system during electrical operation should be noted. When the pilot's control is moved, there is a position lag before the motor direction sensing switches 41a or 41b will close, to allow the servo control valves on the hydraulic cylinders to open. If this lag did not occur, oil would be trapped in the cylinders, resulting in a locked system while the motor was energized.

Several other features of the invention as described should be noted. The shift from one system to the other can be made at any position of the elevon, as both of the motor control systems and both the follow-up systems move together, without change in elevon position, even under overload limit conditions. The response speed of both motor systems can be made approximately the same, and if a shift has once been made to the electric system from the hydraulic system the airplane can be returned to hydraulic control at any time, provided the hydraulic system is in order. In fact, it is standard practice in one installation constructed and operated substantially as described herein that has already been flight tested, for the pilot to check both of the systems by pressing push button 126 to temporarily shift surface control from the hydraulic motor system to the electrical control system, and back again, on the ground or in flight as desired.

The close functional similarity of both hydraulic and electric systems in their drive links from airframe to elevon should be particularly noted. In the electric system, the clutch 72 opens the driving link between motor 75 and the elevon 4 and permits the surface to move and free wheel while under power from the hydraulic motor, with relative motion taking place between a stationary part of the drive link, i. e. the motor and high speed reduction gear; and a moveable part of the drive link, i. e. drive quadrant, drive pulleys and cable, and low speed reduction gears.

Similarly, in the hydraulic system, the pressure line valve L, by affording an unobstructed outlet for the hydraulic fluid on both sides of the piston with no applied pressure, permits relative motion between a stationary part of the drive link, i. e., the piston rod and piston, and the moveable part of the drive link, i. e., the cylinder 28 and elevon arm when the surface is moving under power from the electrical motor. Each of the electric and hydraulic links are thus capable of being reversed by the other when the other is driving.

The following table gives the equivalent parts in both systems:

|  | Hydraulic System | Electrical System |
| --- | --- | --- |
| Motor | Hydraulic cylinder 28 and piston | Reversible electric motor 75. |
| Shifting means | Pilot's switches 122, 126, and pressure switch P controlling source pressure, and free wheeling in drive link. | Pilot's switches 122, 126, and pressure switch P controlling source current and free wheeling in drive link. |
| Torque limiting means | Pressure regulator in hydraulic pump 36. | Torque limiter 76 and associated switches 104, 107, and 111. |
| Synchronizing means (motors) | Attachment of spool 26 to move with sensing switches 41a and 41b with same neutral and same relative stroke. | Attachment of sensing switches 41a and 41b to move with spool 26 and with same neutral and same relative stroke. |
| Synchronizing means (feed back) | Attachment of surface to cylinder 28 and valve 27 with same neutral and relative stroke as cam 45. | Attachment of surface to cam 45 with same neutral and relative stroke as valve 27. |
| Drive link, airframe to surface | Piston and piston rod 30, cylinder 28, fluid in cylinder, and elevon arm. | Motor 75, gears 74, clutch 72, gears 71, drive pulley 61, cables 62 and quadrant 64. |
| Free wheeling device | Pressure line valve L freeing cylinder 28 from fluid under pressure to open drive link. | Clutch 72 opening drive link. |
| Drive link lock | Neutral leakage in valve 27 | Motor brake 77. |
| Motor control (pilot) | Spool 26 moved in valve 27 by pilot's control. | Direction sensing switches 41a and 41b moved by pilot's control. |
| Feed back (surface) | Attachment of valve 27 to hydraulic cylinder 28 moving with surface. | Attachment of cam 45 to surface to move with surface. |

It is to be noted that when the electric system is in operation it also operates in a "fail safe" condition in that upon failure of electric power, the elevon control automatically reverts to the hydraulic motor, i. e., clutch 72 will open to permit the electrical drive to free wheel, and the pressure line valve L will open the hydraulic pressure line 34 to the hydraulic valve. Thus, either system will automatically transfer control to the other upon failure of the power source of the operating system.

While the invention has been described as embodying two separate systems of substantially equal power, it will be obvious to those skilled in the art that they can equally well be of unequal power, with the system of greater power being used as the normal surface control system, with the other system maintained as an emergency or standby system. This arrangement is particularly attractive when the hydraulic system is used as the standard control system, with an electrical system held in reserve for operation by storage batteries for example, in case of loss of power from other sources. The power of the electrical system can then be reduced to a valve providing only the required emergency operation, without, however, otherwise changing the quality of control.

From the above description, it will be seen that two wholly different motor systems operating from wholly different and separate power sources have been provided to move the same surface, by operation of the same pilot's control element, utilizing the same movement signals with each system providing substantially the same response to these signals when in use. While only one of the systems is used at any one time, the controls and feed back for the other system are so moved by the pilot and the surface that a shift from one system to the other system can be made at any time at the will of the pilot, or automatically upon failure of the power supply in either system when that system is used as a primary control system.

While reference has been made herein to the pilot of the airplane as being human, automatic piloting devices are frequently used to take over the control element movements normally performed by the human pilot. The system herein described is ideally suited for automatic pilot control, as the signal forces are small, and the motor assemblies themselves act to supply all the power required to move the controlled surfaces. Furthermore, due to the matched control characteristics of the two separate power systems, a shift from one power system to the other does not require any substantial change in autopilot operation. The term pilot as used herein is, therefore, deemed to include both human and automatic pilots.

What is claimed is:

1. In an airplane control system, a pilot's control element, a control surface to be moved, a pair of power sources of dissimilar type, a pair of motors of dissimilar type each suitable for energization from one of said power sources, each of said pair of motors being connectable to move said surface when energized, a pair of motor control assemblies, each of said motor control assemblies including a control member and a cooperating feedback member, each of said control members being connected to be synchronously moved by said pilot's control element, each of said feedback members being connected to be synchronously moved by said surface, a first motor control means positioned to be operated in accordance with relative movement of one of said control members and the cooperating feedback member from a neutral position, a second motor control means positioned to be operated in accordance with relative movement of the other of said control members and its cooperating feedback member from a neutral position, each of said motor control means being connected to control the operation of one of said motors in accordance with the direction of relative motion of the connected control member and cooperating feedback member, motor energizing means operable to connect one or the other of said sources to a suitable motor control means whereby the energized motor will actuate said surface in accordance with motion of said pilot's control element, and means operating to free wheel the other motor.

2. Apparatus in accordance with claim 1 wherein said motor energizing means in positioned adjacent said pilot's control element.

3. Apparatus in accordance with claim 1, wherein said motor energizing means is connected to be operated in accordance with energy failure of the particular power source in use, to connect the other power source to the other motor control means.

4. Apparatus in accordance with claim 1, wherein one of said sources is hydraulic and the other is electric.

5. Apparatus in accordance with claim 1, wherein one of said sources is hydraulic and the other is electric, and wherein both of said motors are connected to move said surface at substantially the same speed when energized.

6. Apparatus in accordance with claim 1, wherein a torque limiting means is connected to each motor to limit the maximum power that can be applied to said surface.

7. Apparatus in accordance with claim 1, wherein one of said motors is a hydraulic cylinder and piston and the other is an electric motor and wherein said respective free wheeling means are a pressure relief valve opening both sides of said piston to a hydraulic fluid return line, and a clutch in the connection between said electric motor and said surface.

8. In an airplane control system, a pilot's control, a surface to be controlled, a first source of power, a first motor connected to move said surface, a first motor control connected to be operated by movement of said pilot's control and connected to control power from said first source of power to operate said motor in accordance with the extent and direction of movement of said pilot's control, a second source of power, a second motor connectable to move said surface, a second power source, a second motor control connected to be operated by movement of said pilot's control and connectable to control power from said second source to said second motor in accordance with the extent and direction of movement of said pilot's control, said first and second motor controls being simultaneously operated and synchronized with respect to pilot's control movements, means connecting said second motor to said second motor control and to said surface and connected to be operable upon cessation of response of said first motor to movements of said first motor control, and means permitting said second motor to move said first motor after the latter has ceased operating.

9. In a full powered airplane attitude control system, a pilot's control element, a surface to be controlled, a motor assembly comprising a power source, a motor connected to move said surface when energized from said source, motor control means moveable by said pilot's control element from a neutral position to energize said motor, feed back means moving with said surface and connected to de-energize said motor when said feed back means corresponds in position to a position to which said motor control means is moved by said pilot's control element, and a second motor assembly comprising a source of electrical power, an electric motor connectable to move said surface when energized, electric motor control means moveable by said pilot's control element from a neutral position to connect said electric motor control means to said electrical motor, a second feed back means moving with said surface and connected to de-energize said electric motor when said feed back means corresponds in position to a position to which said electrical motor control means was moved by said pilot, and means for simultaneously connecting said electric motor to move said surface, said electrical motor control means to said electrical source, and for disconnecting said first motor from said first power source.

10. Apparatus in accordance with claim 9, wherein said latter means is a reversible means to disconnect said electric motor from said surface and from said electrical source and to reconnect said first motor to said first power source.

11. Apparatus in accordance with claim 9, wherein the last recited means is connected to be operated by failure of said first power source.

12. Apparatus in accordance with claim 9, wherein said last recited means is a manually operable means and is positioned adjacent said pilot's control element.

13. An airplane control system comprising the combination of a pilot's control, an attitude control surface to be moved, a power supply, a motor assembly connected to move said surface under full power when energized from said power supply in accordance with the direction and extent of movement of said pilot's control, and an electric motor assembly comprising an electric motor, a drive link between said surface and said motor and connected to move said surface, said drive link containing an electrically operated clutch, a source of electrical power, a switch moveable in accordance with the movements of said pilot's control, a cam moveable in the same direction in accordance with movement of said surface, said switch and said cam cooperating to hold said switch open when both said pilot's control and said surface are stationary and closed when said pilot's control is moved, and means positioned adjacent said pilot's control to simultaneously de-energize said first motor, to connect said switch to said source and to close said electrically operated clutch.

14. Apparatus in accordance with claim 13, wherein said last means is an electrical switch.

15. Apparatus in accordance with claim 13, wherein a torque measuring device is made a part of said drive link, an overload switch actuated by said torque measuring device, said overload switch being in series with said first mentioned switch and opened at a predetermined output value of said torque measuring device.

16. Apparatus in accordance with claim 13, wherein a torque measuring device is made a part of said drive link, an overload switch actuated by said torque measuring device, said overload switch being in series with said first mentioned switch and opened at a first predetermined output value of said torque measuring device, and a free wheeling switch closed by said torque measuring device at a second predetermined output value of said torque measuring device higher than said first predetermined value and connected to open said electrically operated clutch when closed.

17. Apparatus in accordance with claim 13, wherein said electrical motor assembly is connected to move said surface substantially the same distance at substantially the same speed in response to movement of said pilot's control as said surface is moved by said first motor assembly in response to the same movement of said pilot's control.

18. In an airplane attitude control system, a pilot's control element, a surface to be moved for attitude control, an electrical power source, a reversible motor, a switch connected to said motor to operate said motor in one direction, a second switch connected to said motor to operate said motor in the opposite direction, spaced switch actuating means mounted on a rotatable member to describe coextensive arcuate paths, an arcuate cam positioned on a second rotatable member to describe a second arcuate path on a common center with that of said first arcuate paths, said cam being so proportioned and arranged with respect to said actuating means to hold both switches open by opposite end contacts with said switch actuating means and to close one switch only when said switch actuating means and said cam are relatively moved, one of rotatable members being moveable by said pilot's control, the other of said rotatable members being connected to rotate in accordance with movement of said surface, a drive link between said motor and said surface, an electrical operated clutch in said drive link, and a switch connecting said switches and said clutch to said source to place said motor under control of said first mentioned switches and to transmit motor power through said link.

19. Apparatus in accordance with claim 18, wherein said drive link includes a torque measuring device, and wherein means are provided to open said clutch at a predetermined output value of said torque measuring device.

20. Apparatus in accordance with claim 18, wherein said drive link includes a torque measuring device, and wherein means are provided for de-energizing said motor at a predetermined output value of said measuring device.

21. In an airplane attitude control system, a surface to be moved for attitude control means, a source of electrical power, a pilot's control, an electrical motor, a drive link connected between said motor and said surface for movement thereof when said motor is energized, said drive link including an electrically operated clutch, an electrically operated motor brake, a torque limiter, and an overload switch operated by said torque limiter, means connected to energize said motor in accordance with the direction and extent of said pilot's control, and connected to simultaneously release said brake and clutch said motor to said surface through said link.

22. In a full powered airplane attitude control system, a pilot's control element, a surface to be controlled, a first motor assembly comprising a first power source, a first motor connectable to move said surface when energized from said first source, first motor control means movable by said pilot's control element from a neutral position to energize said first motor, first feedback means moving with said surface and connected to de-energize said first motor when said first feedback means corresponds in position to a position to which said first motor control means is moved by said pilot's control element, and a second motor connectable to move said surface when energized, second motor control means movable by said pilot's control element from a neutral position in synchronism with said first motor control means to connect said second motor control means to said second motor, a second feedback means moving with said surface in synchronism with said first feedback means and connected to de-energize said second motor when said second feedback means corresponds in position to a position to which said second motor control means was moved by said pilot, and shifting means operable to connect one or the other of said motors to move said surface.

23. In a full powered airplane attitude control system, a pilot's control element, a surface to be controlled, a first motor assembly comprising a first power source, a first motor connectable to move said surface when energized from said first source, first motor control means movable by said pilot's control element from a neutral position to energize said first motor, first feedback means moving with said surface and connected to de-energize said first motor when said first feedback means corresponds in position to a position to which said first motor control means is moved by said pilot's control element, and a second motor assembly comprising a second source of power, a second motor connectable to move said surface when energized, second motor control means movable by said pilot's control element from a neutral position in synchronism with said first motor control means to connect said second motor control means to said second motor, a second feedback means moving with said surface in synchronism with said first feedback means and connected to de-energize said second motor when said second feedback means corresponds in position to a position to which said second motor control means was moved by said pilot, and means for simultaneously connecting said second motor to move said surface, said second motor control means to said second source, and for disconnecting said first motor from said first power source.

24. In a full powered airplane attitude control system, a pilot's control element, a surface to be controlled, a first motor assembly comprising a first power source, a first motor connected to move said surface when energized from said first source, first motor control means movable by said pilot's control element from a neutral position to energize said first motor, first feedback means moving with said surface and connected to de-energize said first motor when said first feedback means corresponds in position to a position to which said first motor control means is moved by said pilot's control element, and a second motor assembly comprising a second source of power, a second motor connectable to move said surface when energized, second motor control means movable by said pilot's control element from a neutral position in synchronism with said first motor control means to connect said second motor control means to said second motor, a second feedback means moving with said surface in synchronism with said first feedback means and connected to de-energize said second motor when said second feedback means corresponds in position to a position to which said second motor control means was moved by said pilot, and means for simultaneously connecting said one of said motors to move said surface, said corresponding motor control means to said corresponding source, and for disconnecting said the other motor from the other power source.

25. In a full powered airplane attitude control system, a pilot's control element, a surface to be controlled, a first motor assembly comprising a first power source, a first motor connected to move said surface when energized from said first source, first motor control means movable by said pilot's control element from a neutral position to energize said first motor, first feedback means moving with said surface and connected to de-energize said first motor when said first feedback means corresponds in position to a position to which said first motor control means is moved by said pilot's control element, and a second motor assembly comprising a second source of power, a second motor connectable to move said surface when energized, second motor control means movable by said pilot's control element from a neutral position in synchronism with said first motor control means to connect said second motor control means to said second motor, a second feedback means moving with said surface in synchronism with said first feedback means and connected to de-energize said second motor when said second feedback means corresponds in position to a position to which said second motor control means was moved by said pilot, and shifting means operable to connect either one or the other of said motors to move said surface, the relative positions of said first and second control means and said first and second feedback means being the same in all positions of said pilot's control element.

26. In a full powered airplane attitude control system, a pilot's control element, a surface to be controlled, a motor assembly comprising a hydraulic power source, a hydraulic motor connected to move said surface when energized from said source, hydraulic motor control means movable by said pilot's control element from a neutral position to energize said hydraulic motor, first feedback means moving with said surface and connected to de-energize said hydraulic motor when said first feedback means corresponds in position to a position to which said hydraulic motor control means is moved by said pilot's control element, and a second motor assembly comprising a source of electrical power, an electric motor connectable to move said surface when energized, electric motor control means movable by said pilot's control element from a neutral position in synchronism with said first motor control means to connect said electric motor control means to said electrical motor, a second feedback means moving with said surface in synchronism with said first feedback means and connected to de-energize said electric motor when said second feedback means corresponds in position to a position to which said electrical motor control means was moved by said pilot, and means for simultaneously connecting said electric motor to move said surface, said electric motor control means to said electrical source, and for disconnecting said first motor from said first power source.

27. In a full powered airplane attitude control system, a surface to be controlled, a pair of motors each connected to move said surface control means when energized, a motor control means connected to control each of said motors, a pilot's control element connected to move both of said motor control means in synchronism, a pair of power sources, and power shifting means operable to connect, in one condition, one of said power sources to one of said motor control means, and to connect, in another condition, the other of said power sources with the other of said motor control means.

28. In a full powered airplane attitude control system, a surface to be controlled, a pair of motors each connected to move said surface control means when energized, a motor connected to control each of said motors, a pilot's control element connected to move both of said motor control means in synchronism, a pair of power sources, and power shifting means selectively operable to connect one of said power sources to one of said motor control means, and to connect the other of said power sources with the other of said motor control means, and further connections operated by operation of said power shifting means to free wheel the motor controlled by the motor control means not connected to a power source.

THOMAS A. FEENEY.
ALVIN R. VOGEL.

No references cited.